(12) United States Patent
Gunsberg

(10) Patent No.: US 12,522,304 B2
(45) Date of Patent: Jan. 13, 2026

(54) MOBILE RAILING ASSEMBLY FOR TRAILERS

(71) Applicant: David B. Gunsberg, Oak Park, MI (US)

(72) Inventor: David B. Gunsberg, Oak Park, MI (US)

(73) Assignee: David B. Gunsberg, Oak Park, MI (US)

( * ) Notice: Subject to any disclaimer, the term of this patent is extended or adjusted under 35 U.S.C. 154(b) by 0 days.

(21) Appl. No.: 19/049,962

(22) Filed: Feb. 10, 2025

(65) Prior Publication Data

US 2025/0256784 A1    Aug. 14, 2025

Related U.S. Application Data

(60) Provisional application No. 63/551,783, filed on Feb. 9, 2024.

(51) Int. Cl.
| | |
|---|---|
| *B62D 33/00* | (2006.01) |
| *B62D 33/02* | (2006.01) |
| *B62D 33/033* | (2006.01) |

(52) U.S. Cl.
CPC ....... *B62D 33/0207* (2013.01); *B62D 33/033* (2013.01)

(58) Field of Classification Search
CPC .............. B62D 33/0207; B62D 33/033; B62D 33/037; B60P 1/4457; E04G 5/142

USPC ...... 296/3, 14, 26.05, 182.1, 186.1; 182/113
See application file for complete search history.

(56) References Cited

U.S. PATENT DOCUMENTS

| | | | | |
|---|---|---|---|---|
| 4,542,806 A | * | 9/1985 | Olson | B25H 5/00 |
| | | | | 182/116 |
| 5,634,681 A | * | 6/1997 | Gionta | B60P 3/14 |
| | | | | 296/3 |
| 6,592,162 B2 | * | 7/2003 | Felix | B62D 33/0276 |
| | | | | 296/3 |
| 2010/0072780 A1 | * | 3/2010 | Barna | B62D 33/0207 |
| | | | | 296/43 |

* cited by examiner

*Primary Examiner* — Stephen T Gordon
(74) *Attorney, Agent, or Firm* — Bodman PLC

(57) ABSTRACT

A railing assembly for use with a flatbed trailer is disclosed. The railing assembly includes cooperable posts extending in an upwardly direction and a plurality of elongated members extending laterally between the cooperable posts. Each of the cooperable posts is supported on a caster system that includes a plurality of casters enabling rolling movement of the railing assembly relative to the flatbed trailer. A connector system is slidably engaged with any of said cooperable posts enabling adjustment of the height of the connector system. The ability to adjust the height of the connector system enables engagement with a variety of flatbed trailer having varying heights and sizes for securing said railing assembly to the flatbed trailer.

10 Claims, 10 Drawing Sheets

MOBILE RAILING ASSEMBLY FOR TRAILERS

PRIOR APPLICATIONS

The present application claims priority to U.S. Provisional Patent Application No. 63/645,977 filed on May 13, 2024 and to U.S. Provisional Patent Application No. 63/551,783 filed on Feb. 9, 2024, the contents each of which are incorporated herein by reference.

TECHNICAL FIELD

The present invention relates generally towards a rail assembly for trailers. More specifically, the present invention relates towards a mobile rail assembly for trailers.

BACKGROUND

Ever-evolving health and safety standards for employees has made it increasingly necessary to adopt safety measures to prevent workplace injuries. One such example for increased safety measures is the need to prevent employees from falling off flatbed trailers and the like. A railing system has been developed to attach to such flatbed trailers and is disclosed in U.S. Pat. No. 11,591,029, the contents of which are included herein by reference. The system has proven to enhance employee safety and is adjustable to meet the needs of various sized flatbed trailers. However, using the system is known to be somewhat slow due to installation requirements. Specific instances involve multiple uses on large numbers of trailers loading and offloading and in a single truck bay. Therefore, it would be desirable to develop a system that is more quickly adapted for frequent use on a variety of flatbed trailers.

As such, a need exists for an improved, more rapidly attachable railing system for flatbed truck that provides flexibility for use with a variety of different sized flatbed trucks.

SUMMARY

A railing assembly for use with a flatbed trailer is disclosed. The railing assembly includes cooperable posts extending in an upwardly direction and a plurality of elongated members extending laterally between the cooperable posts. Each of the cooperable posts is supported on a caster system that includes a plurality of casters enabling rolling movement of the railing assembly relative to the flatbed trailer. A connector system is slidably engaged with any of said cooperable posts enabling adjustment of the height of the connector system. The ability to adjust the height of the connector system enables engagement with a variety of flatbed trailer having varying heights and sizes for securing said railing assembly to the flatbed trailer.

The addition of the caster system and universal connector system enables the railing assembly to be rapidly moved between flatbed trailers and rapidly connected to the trailers without securing and disassembling individual posts with each flatbed trailer between uses.

Any of the above aspects can be combined in full or in part. Any features of the above aspects can be combined in full or in part. Any of the above implementations for any aspect can be combined with any other aspect. Any of the above implementations can be combined with any other implementation whether for the same aspect or a different aspect.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
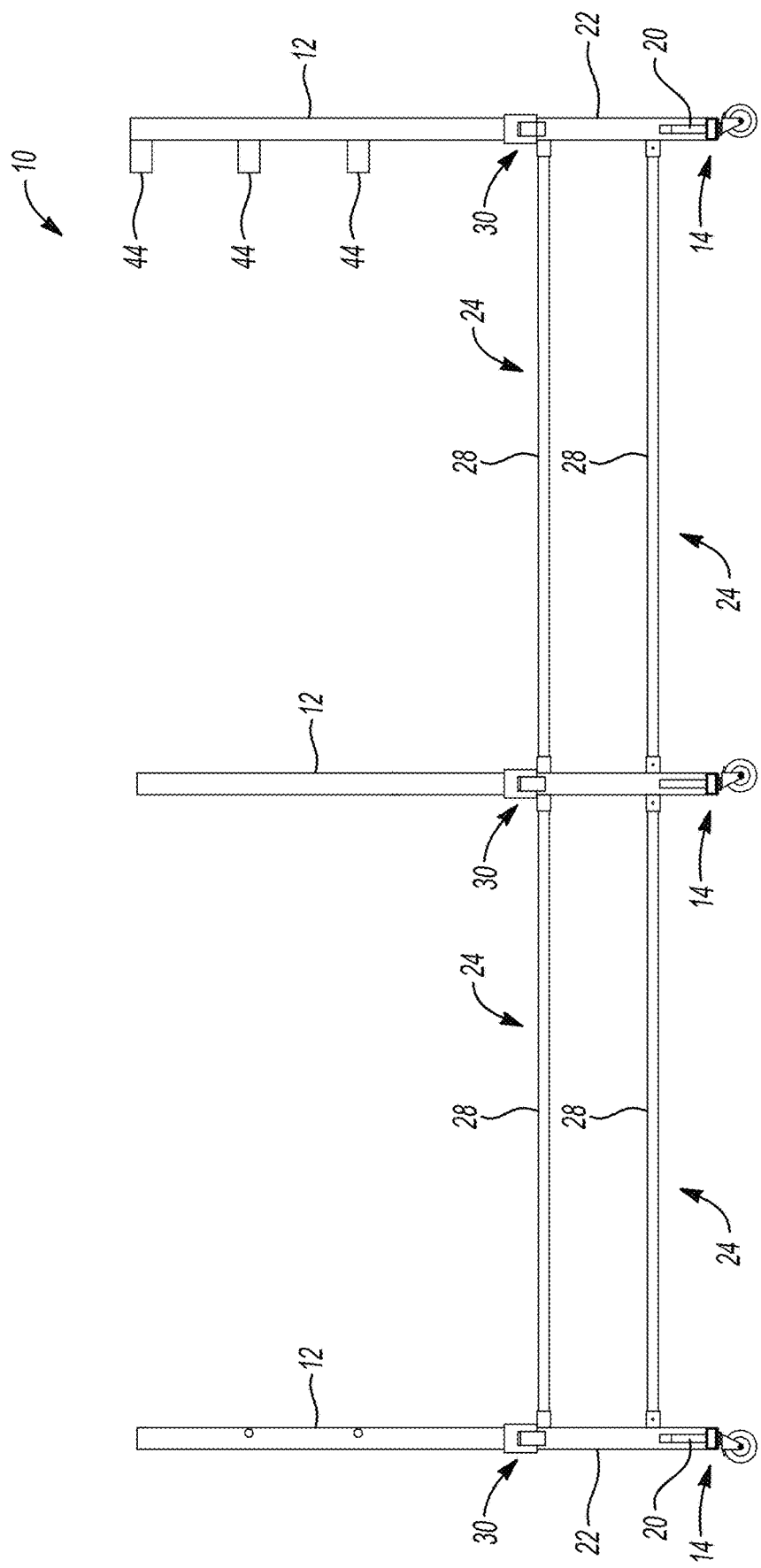
FIG. 1 shows a partially assembled front view of the assembly of the present invention.
Figure 2:
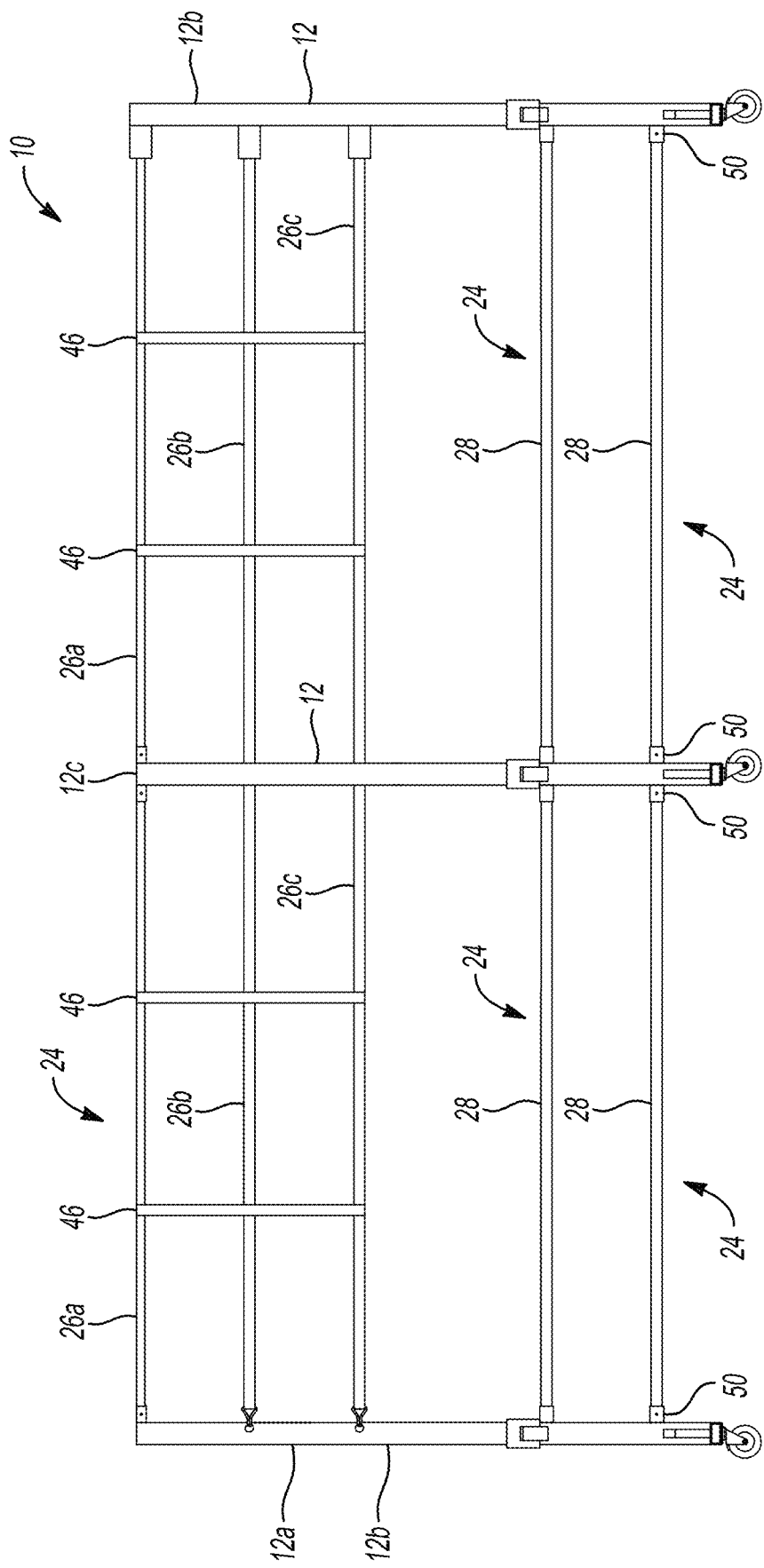
FIG. 2 shows a fully assembled front view of the assembly of the present invention.

Referring to FIGS. 1 and 2, the rail assembly of the present invention is generally shown at 10. The rail assembly 10 includes a plurality of cooperable posts 12 extending in a vertical direction. A caster system 14 supports each of the posts 12. Each caster system 14 defines a caster frame 16 oriented in a horizontal direction interconnecting spaced first and second caster wheels 18. A caster support 20 extends upwardly from each caster frame 16 and presents an extension 22 extending vertically to each post 12 so that the post 12 is supported by the caster frame 16 in a vertical orientation.

A plurality of elongated members 24 extend laterally between the cooperable posts 12. The elongated members 24 are formed from one of a flexible strap 26 (FIG. 2) or a rigid tube or rod hereinafter referred to rigid members 28. It should be understood that the rigid members 28 may define an annular cross section, a square cross section, or any other cross section suitable for providing a rigid structure extending between each post 12. Each rigid member 28 is releasably affixed at opposing ends to one of the cooperable posts 12 as will be explained further hereinbelow. Likewise, each strap 26 is releasably affixed at opposing ends to one of the cooperable posts 12 as will also be explained further hereinbelow.

A connector system 30 is slidably received by each of the posts 12. The connector system 30 includes a plurality of connector elements 31, each of which is configured to slide in a vertical direction on one of the cooperable posts to facilitate engagement with a slot defined by a flatbed trailer to interlock the rail assembly 10 to the flatbed trailer. Thusly, the rail assembly 10 extends along a length of the flatbed trailer for reducing likelihood of an operator falling from the flatbed trailer. It should be understood by those of ordinary skill in the art, some, or even all of the posts 12 include a slidable connector element 31, the number of which is selected to adequately secure the rail assembly 10 to the flatbed trailer.

Figure 3:
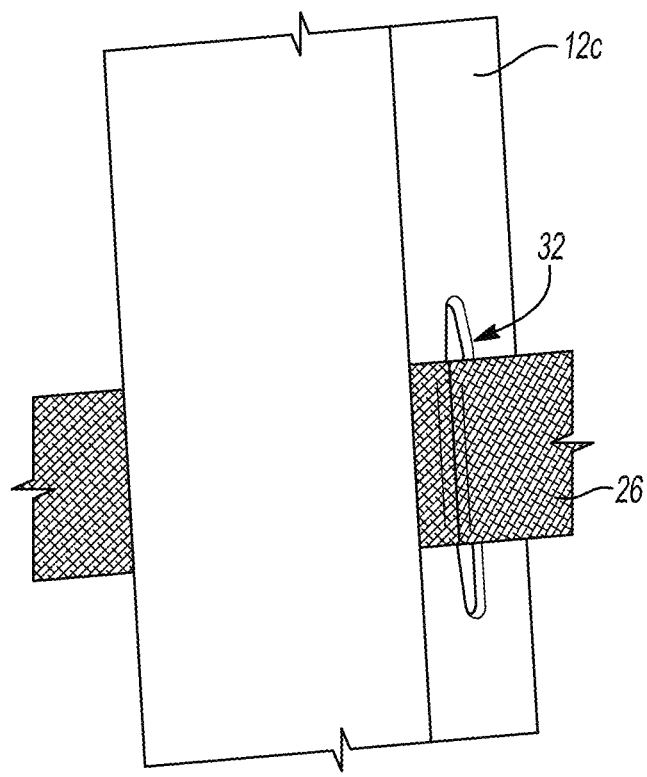
FIG. 3 shows a slot defined by a post of having a strap passing therethrough.

Referring now specifically to FIG. 2, each strap 26 extends between distal 12a and proximal 12b posts presenting a safety rail when the assembly 10 is secured to a flatbed trailer. In one embodiment, an upper strap 26a, a middle strap 26b, and a lower strap 26c, extend in a parallel relationship between the distal 12a and proximal 12b posts. As shown in FIG. 3, each strap 26 passes through a slot 32 defined by a center post 12c when extended between the distal post 12b in the proximal post 12b.

Figure 4:
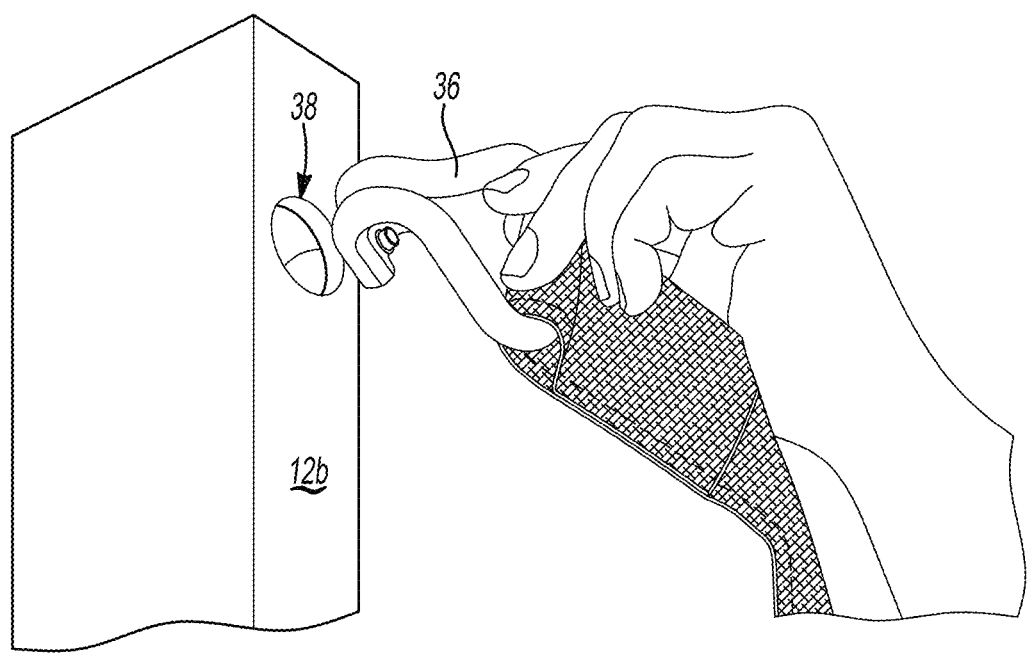
FIG. 4 shows a post and a hook affixed to a distal end of a strap prior to engagement with an aperture defined by the post.
Figure 5:
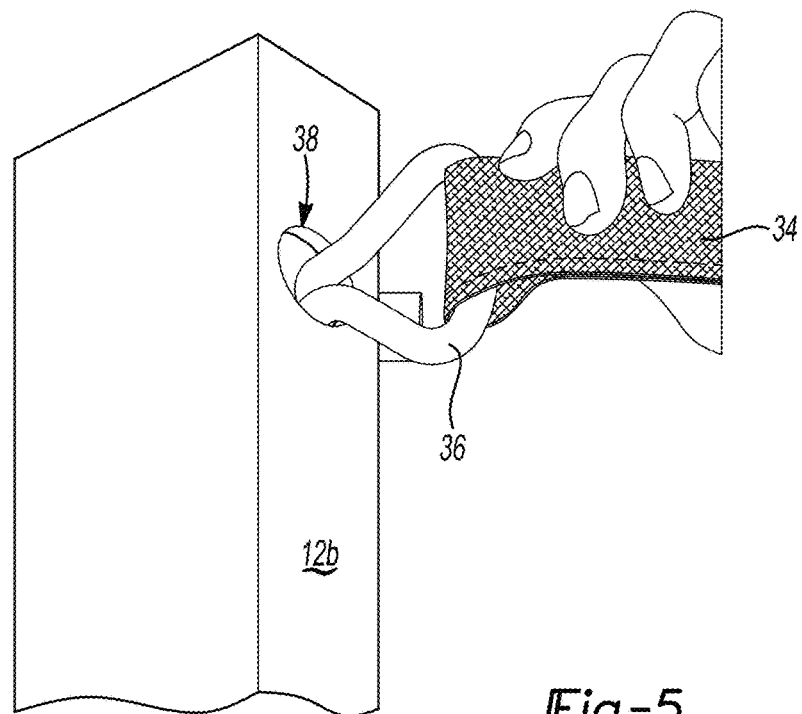
FIG. 5 shows a post and a hook affixed to a distal end of a strap after engagement with an aperture defined by the post.

As best represented in FIG. 4 and FIG. 5, a distal strap end 34 includes a clasp 36, in one embodiment in the shape of a hook, that engages an aperture 38 defined by the distal post 12b. The clasp 36 is optionally permanently affixed to each strap 26. Alternatively, each strap includes Velcro® (hook and loop), snaps or the like to releasably engage the strap 34 to the clasp 36.

Figure 6:
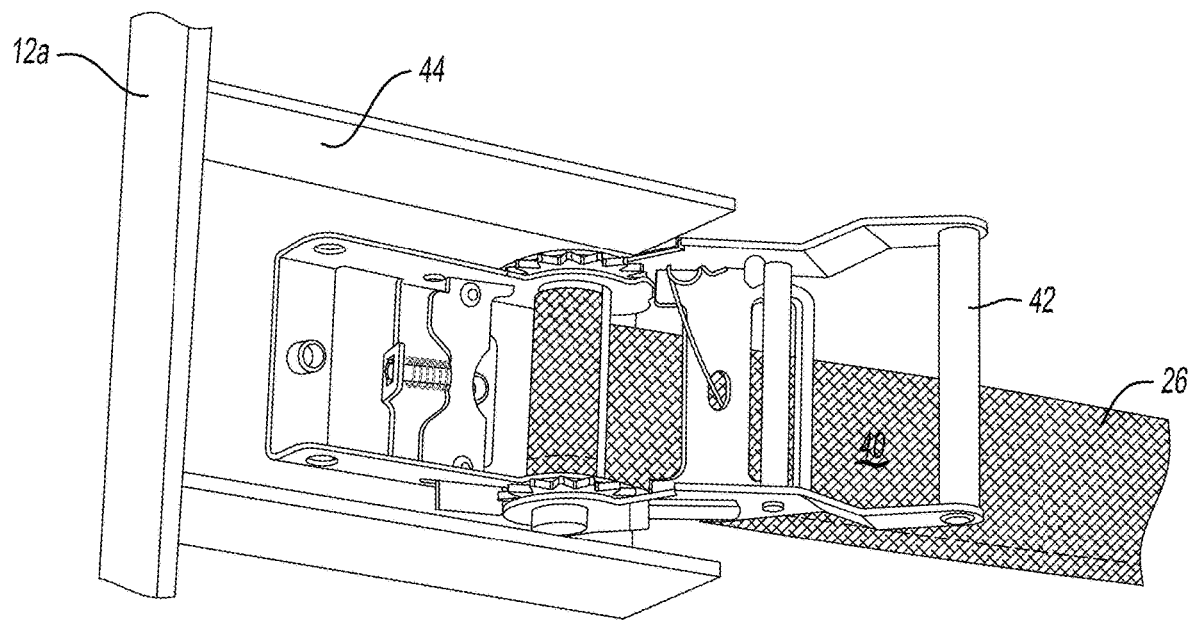
FIG. 6 shows a rachet used to tighten a strap.

Referring now to FIG. 6, a proximal strap end 40 is shown secured to the ratchet 42. The ratchet 42 is affixed to a rachet bracket 44 that is in turn affixed to the proximal post 12a by way of weld, rivet, or alternative fastener. Once the distal strap end 34 is secured to the distal post 12b via the clasp 36, the ratchet 42 is used to tighten the strap 26 between the proximal post 12a and the distal post 12b in a known manner. It should be understood by those of ordinary skill in the art that each of the straps 26a, 26b, 26c include a clasp 36 and a ratchet 42 as described hereinabove.

Figure 7:
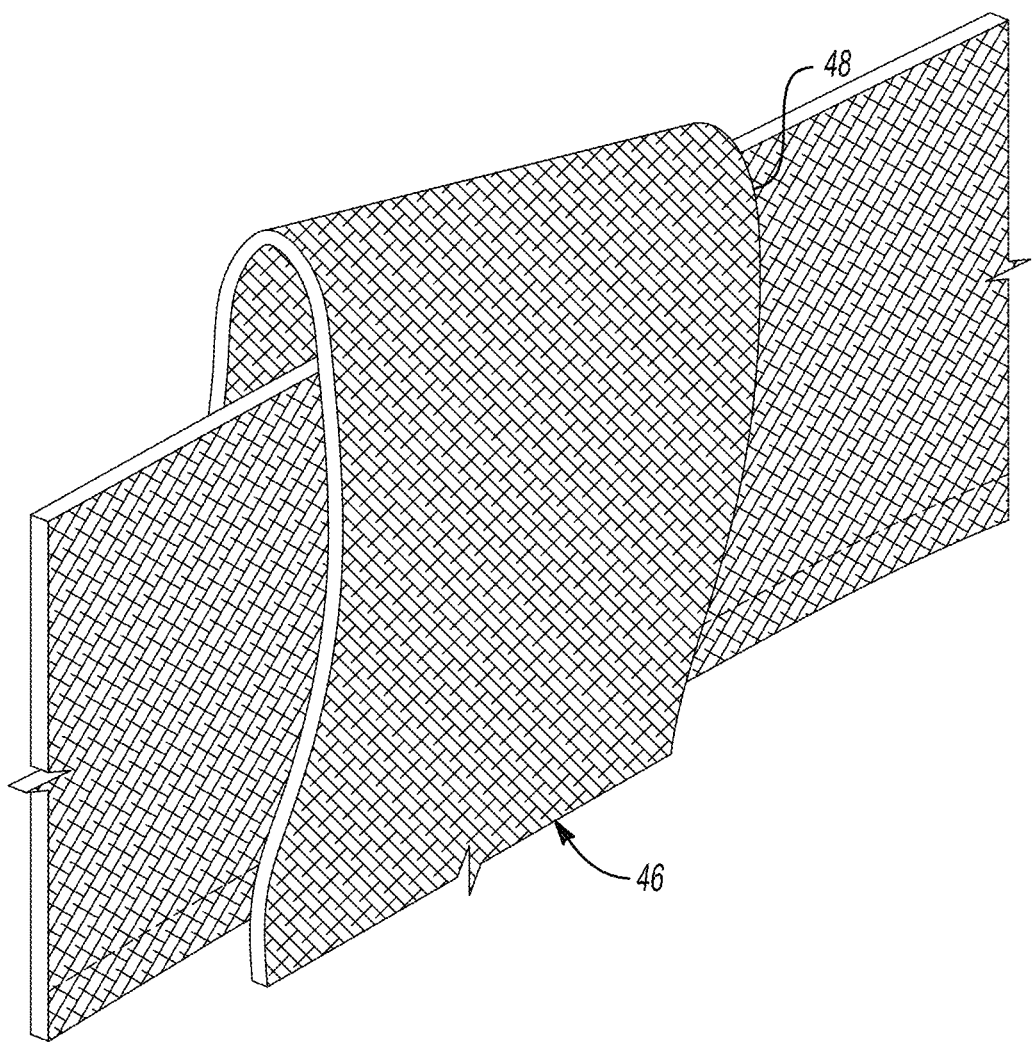
FIG. 7 shows a strap passing through a loop.

Referring now to FIG. 2 and FIG. 7, a plurality of spacers 46 extend perpendicular to the straps 26. The spacers 46 each define a plurality of loops 48 equal to a number of straps 26 extending between the post 12, in this embodiment three, although more or less straps 26 may be included in alternative embodiments. Therefore, each strap 26 passes through one of the loops 48 when being extended between the proximal post 12a and the distal post 12b. The loops 48 are spaced to be disposed at a same height as each of the straps 26 extending between proximal post 12a and the distal post 12b. Thus, the loops 48 maintain consistent spacing between adjacent straps 26 in a vertical direction. In one embodiment, two spacers 46 are disposed between adjacent posts 12. Alternatively, more or less spacers 46 may be disposed between adjacent posts 12. Further, the spacers 46 are slidable along the straps 26 so that each spacer 46 may be positioned the predetermined location.

Figure 8:
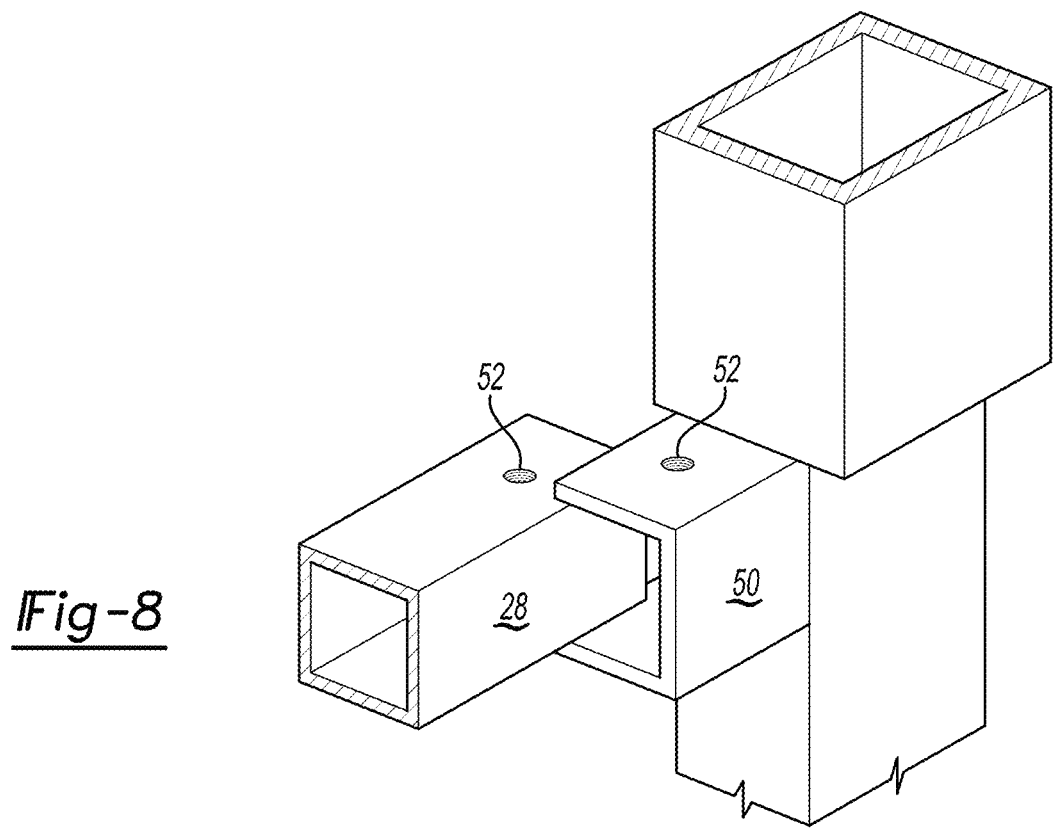
FIG. 8 shows a tube prior to engagement with a tube bracket.
Figure 9:
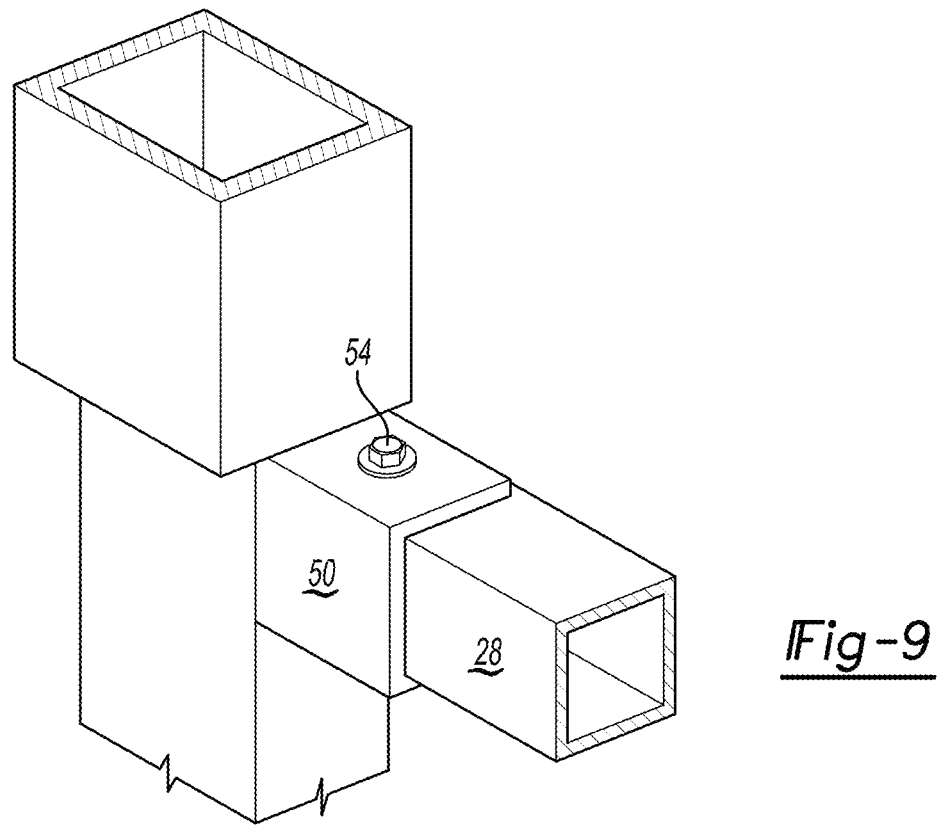
FIG. 9 shows a tube after engagement with a tube bracket.

Referring to FIG. 8 and FIG. 9, each rigid member 28 is releasably attached to adjacent of the posts 12. A tube bracket 50 receives an end of each of rigid member 28 so that cooperative apertures 52 of the tube bracket 50 and the rigid member 28 align to facilitate installation of a fastener or pin 54, the installation of which secures the rigid member 28 end to its respective post 12. It should also be understood that the rigid member 28 and bracket 50 combination may replace one or more of the straps 26 in an alternative embodiment. Still further, it is within the scope of this invention that the rigid member 28 and bracket 50 combination may replace all of the straps 26 so that the entire assembly 10 takes on a rigid structural form. The rigid members 28 maintain a constant distance between each of the posts 12a, 12b, 12c. Thus, in one embodiment the uppermost elongated member 24 and the lower most elongated member 24 may both be rigid members 28.

Figure 10:
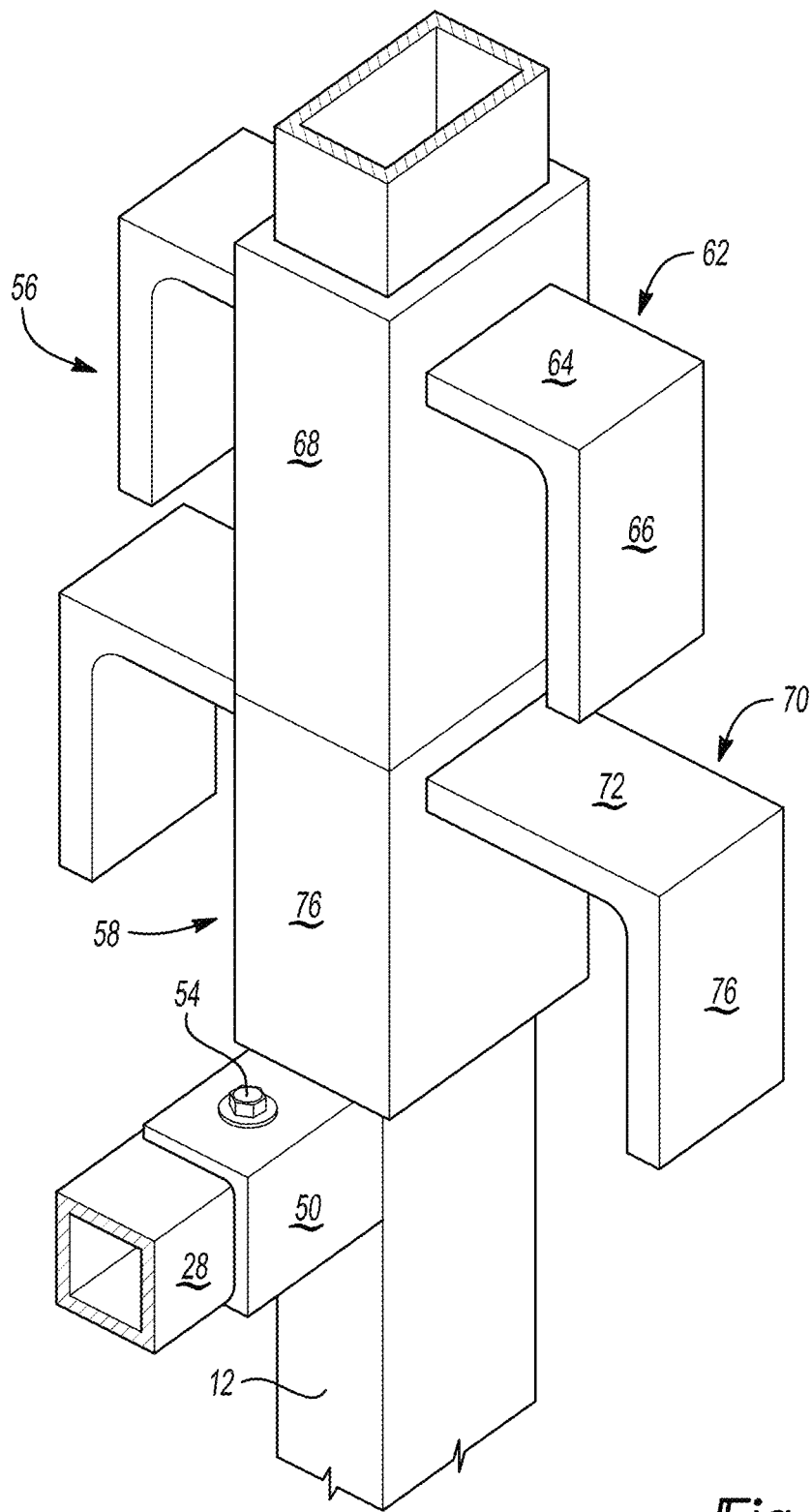
FIG. 10 shows one embodiment of the connector of the present invention.
Figure 11:
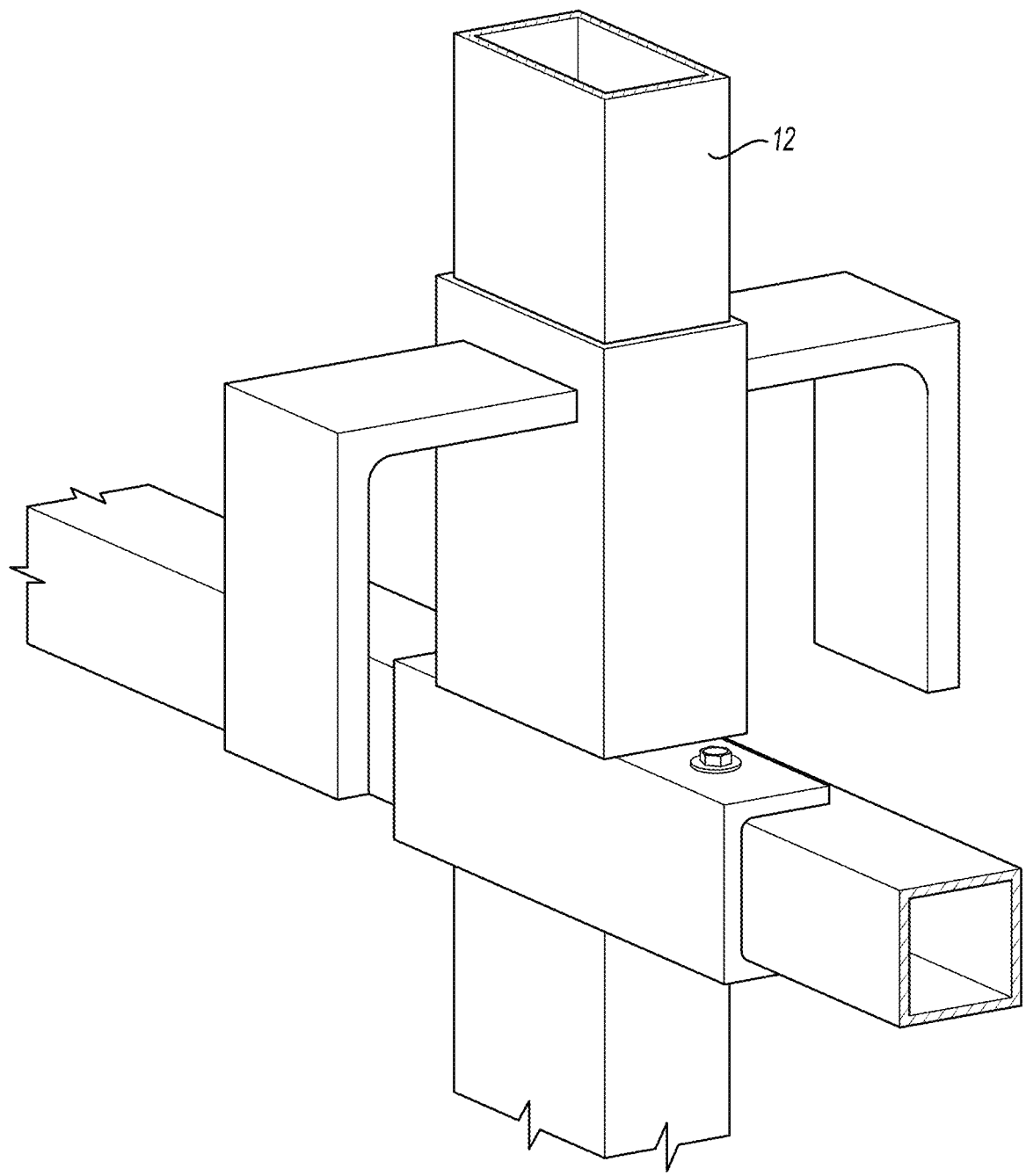
FIG. 11 shows an alternative embodiment of the connector of the present invention.

Referring to FIG. 10 and FIG. 11, each of or some of the posts 12 include the connector system 30. In one embodiment, the connector system 30 includes and upper connector element 56 and a lower connector element 58. The upper connector element 56 includes opposing arms 62 defined by an upper horizontal element 64 at an upper vertical element 66 that extends downwardly from the upper horizontal element 64 at a location spaced a first distance from a sliding member 68 that receives post 12. Likewise, the lower connector element 58 includes opposing arms 70 defined by the lower horizontal element 72 and a lower vertical element 74 that extends downwardly from the lower horizontal element 72 at a location spaced a second distance from a lower sliding member 76. It should be readily apparent by viewing FIG. 9, that the first distance is less than the second.

Depending upon configuration of the flatbed trailer, the upper connector element 56 is slid upwardly on the post 12 so one of the upper opposing arms 62 may engage the slot defined by the flatbed trailer. Alternatively, both the upper connector element 56 and the lower connector element 58 is slid upwardly so that one of the lower opposing arms 70 may engage the slot defined by the flatbed trailer while the upper connector element 56 rests in a disengaged disposition on top of the lower connector element 58.

Figure 12:
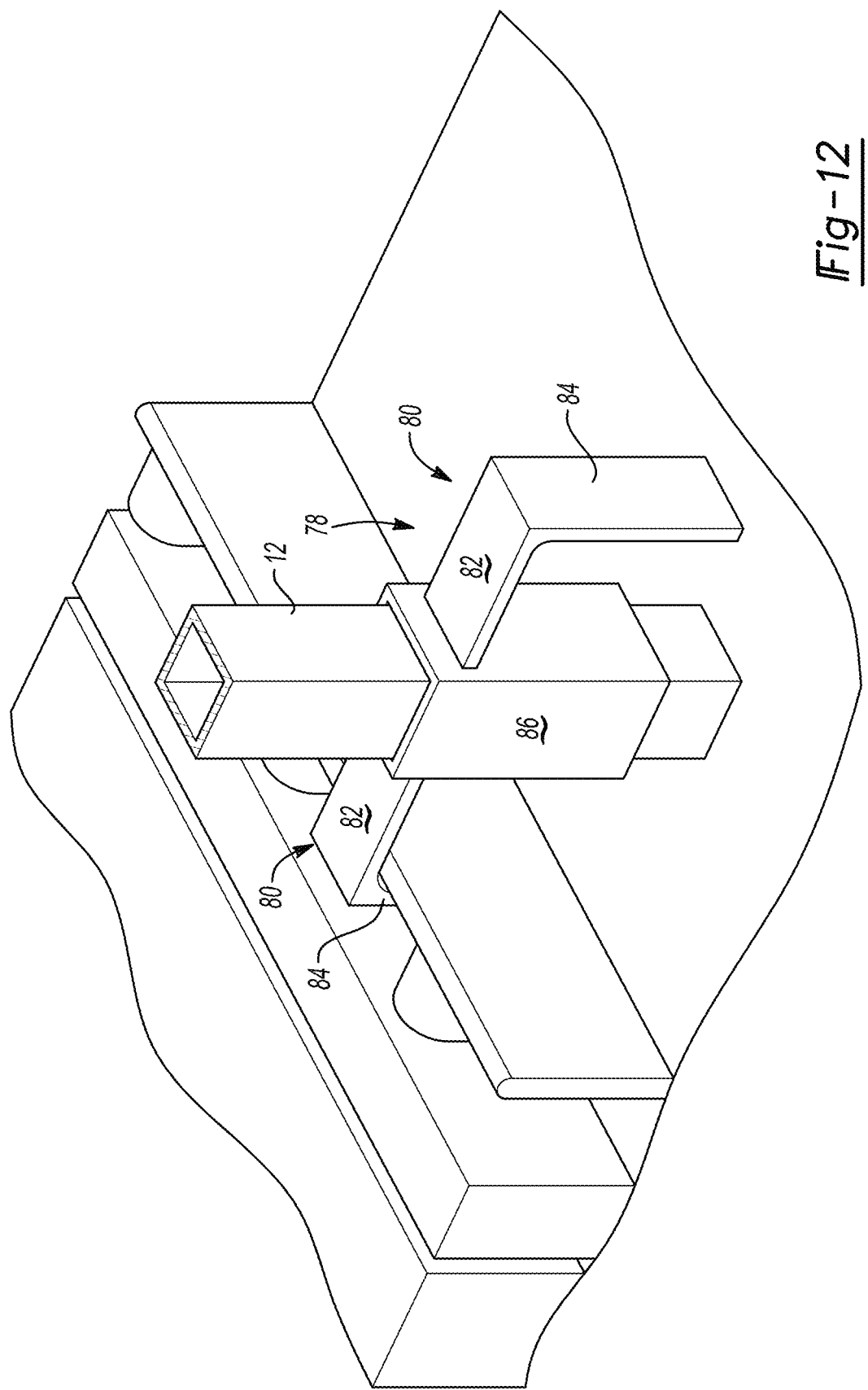
FIG. 12 shows another view of the alternative embodiment of the connector of FIG. 12 attached to a trailer.

An alternative connector element 78 is best represented in FIGS. 11 and 12. The alternative connector element 78 defines opposing alternative arms 80 that define an alternative horizontal element 82 and an alternative vertical element 84. The alternative vertical element 84 is spaced a predetermined distance from an alternative slide member 86 enabling a universal interconnection with a flatbed trailer by way of a reconfigured alternative vertical element 84. Thus, only the single alternative connector element 78 is required for universal interconnection with multiple different flatbed trailer configurations.

Figure 13:
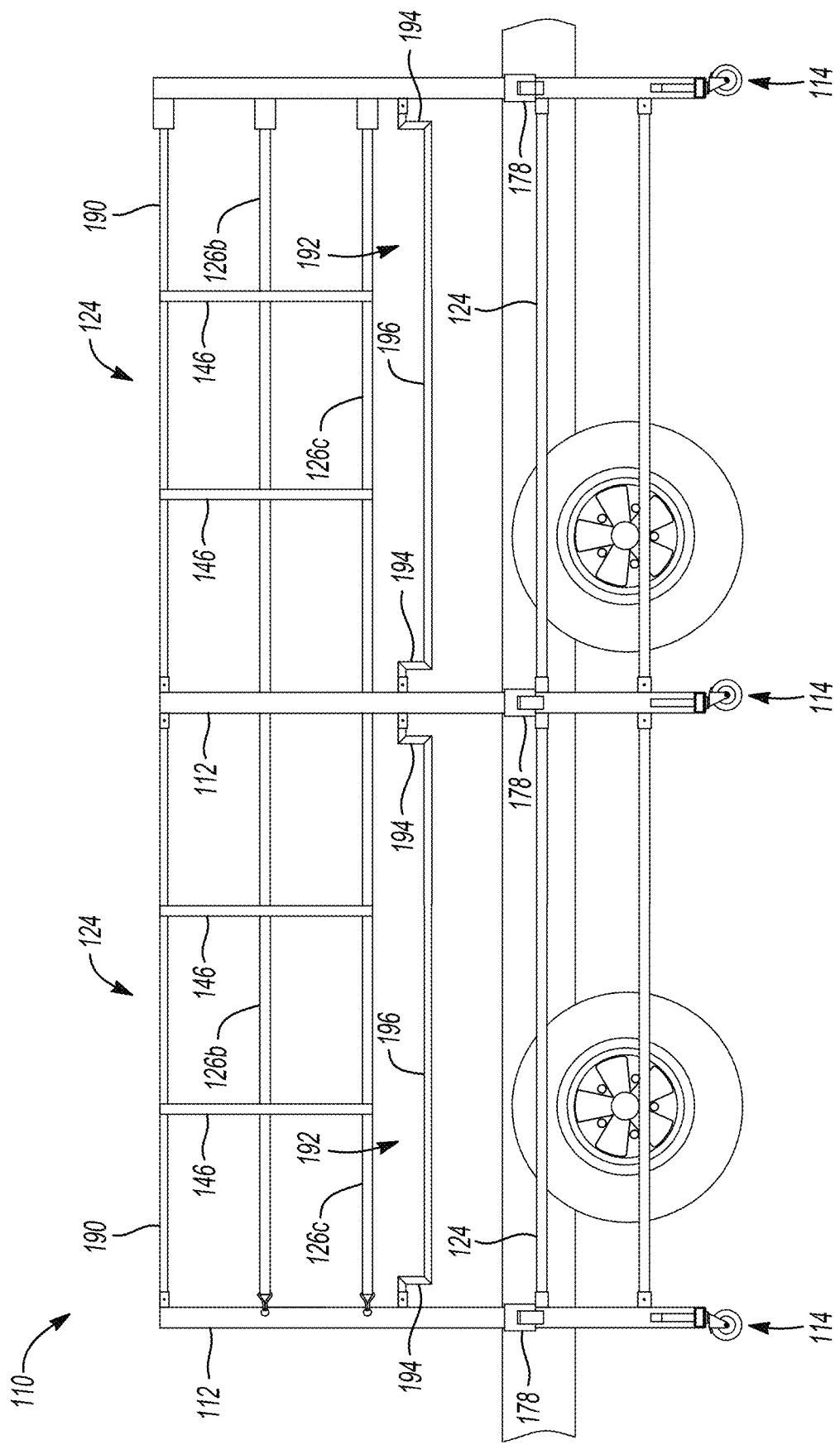
FIG. 13 shows an alternative embodiment of the rail assembly having an upper tube and a lower tube extending between the posts.

Turning now to FIG. 13, an alternative implementation of the rail assembly 110 described above is shown. As will be appreciated from the subsequent description below, the alternative rail assembly 110 is similar to the rail assembly 10 described above in connection with FIGS. 1-12. Like elements are identified with the same element numbers as the earlier described embodiments, but in the 100 series. While the specific differences between these implementations will be described in detail, for the purposes of clarity, consistency, and brevity, only certain structural features and components common between these implementations are discussed and depicted in the drawings of the second implementation of rail assembly 110. Here, unless otherwise indicated, the above description of the first implementation of the rail assembly 10 may be incorporated by reference with respect to the second implementation of the rail assembly 110 without limitation.

As with the embodiment disclosed hereinabove, the rail assembly 110 of FIG. 13 includes the posts 112 laterally spaced from one another and supported on the caster system 14. Here too, a plurality of elongated members 124 extend between adjacent of the posts 112. In this implementation the plurality of elongated members 124 is supplemented with an upper rigid member 190 and an intermediate rigid member 192. The upper rigid member 190 and the intermediate rigid member 192 are of similar configuration and are releasably secured between adjacent posts 112 in a same manner as described hereinabove. The upper rigid member 190 and the intermediate rigid member 192 cooperate to provide increased stability to the assembly 110 when affixed to a trailer and enhanced fall protection. A plurality of spacers 146 are coupled to the upper rigid member 190 and extend downward to space the flexible straps 26.

The intermediate rigid member 192 defines notched end segments 194 disposed at opposing ends of an inner segment 196. Each of the notched end segments 194 are releasably connected to adjacent of the posts 12' to secure the intermediate rigid member 192 to the rail assembly 110. The notched end segments 194 extend from the opposing ends of the inner segment 196 that is disposed at a higher elevation than the inner segment 196, in this embodiment elevated above the inner segment 196. More specifically, the elevated end segments 194 allow the connector elements 178 to be slid upwardly to a height sufficient for coupling the connector element 178, and thus the rail assembly 110 to the trailer. Because the height of the trailer varies depending on the configuration as well as the weight of the cargo loaded onto the trailer, it is desirable that the connector elements 178 be raisable beyond the height of the intermediate rigid member 192. This arrangement enables the intermediate rigid member 192 to be located at a height that is believed to best provide stability while still allowing the connector element 178 to be moved an amount to accommodate a plurality of different trailer bed heights. Thus, the vertical spacing of each of the straps 126B, 126C with the intermediate rigid member 192 is consistent. The intermediate rigid member 192 is constructed from multiple pieces that have been coupled together via a process such as welding in some instances. Alternatively, the intermediate rigid member 192 is extruded as a single piece of material that has been bent to form the raised outer segments 196.

It should be appreciated that the upper rigid member 190 and the intermediate rigid member 192' may be implemented in either embodiment of the rail assembly 10, 110. Therefore, it should be understood to those of ordinary skill in the art that while the first embodiment of the rail assembly 10 and the second embodiment of the rail assembly 110, as illustrated herein, differ by the inclusion of the upper rigid member 190 and the intermediate rigid member 192, both are not required. Thus, the first embodiment of the rail assembly 10 may include only the upper rigid member 190 without the intermediate rigid member 192 or may include only the intermediate rigid member 192 without the upper rigid member 190.

Obviously, many modifications and variations of the present invention are possible in light of the above teachings foregoing invention has been described in accordance with the relevant legal standards; thus, the description is merely exemplary rather than limiting in nature. Variations and modifications to the disclosed embodiment may become apparent to those skilled in the art and do come within the scope of the invention. Accordingly, the scope of the legal protection afforded this invention can only be determined by studying the following claims.

Several instances have been discussed in the foregoing description. However, the aspects discussed herein are not intended to be exhaustive or limit the disclosure to any particular form. Various modifications to these aspects will be readily apparent to those skilled in the art, and the generic principles defined herein may be applied to other aspects without departing from the scope of the disclosure. The terminology that has been used is intended to be in the nature of words of description rather than of limitation. Many modifications and variations are possible in light of the above teachings and the disclosure may be practiced otherwise than as specifically described.

What is claimed is:

1. A railing assembly for use with a flatbed trailer, comprising:
    cooperable posts extending in an upwardly direction;
    a plurality of elongated members extending laterally between said cooperable posts;
    each of said cooperable posts being supported on a caster system including a plurality of casters enabling rolling movement of said railing assembly relative to the flatbed trailer; and
    a connector system being slidable relative to any of said cooperable posts for providing adjustable height of the to said connector system and presenting interlocking engagement of said connector system with the flatbed trailer thereby releasably securing said railing assembly to the flatbed trailer.

2. The railing assembly set forth in claim 1, wherein said plurality of elongated members includes at least one of a flexible strap and a rigid member.

3. The railing assembly set forth in claim 2, wherein said flexible strap extending between said cooperable posts and being interconnected at a distal strap end to a distal post with a clasp and being interconnected at a proximal strap end with a ratchet that is affixed to a proximal post, said ratchet providing adjustment to a length of said flexible strap.

4. The railing assembly set forth in claim 2, wherein opposing ends of said rigid member each releasably engages tube brackets disposed upon said cooperable posts thereby securing said cooperable posts at a fixed distance defined by a length of said rigid member.

5. The railing assembly set forth in claim 2, wherein said connector system comprises a connector element including an arm being configured to interlock with said flatbed trailer for releasably securing said railing assembly with said flatbed trailer.

6. The railing assembly set to forth in claim 5, wherein said connector system comprises a plurality of connector elements, each of said connector elements being slidably engaged to one of said cooperable posts for providing the adjustable height of the connector system.

7. The railing assembly set forth in claim 6, wherein said rigid member extending between adjacent ones of said posts includes notched end segments being disposed at a different elevation than a central portion of said rigid member thereby providing spacing for adjusting a height of said connector elements.

8. The rail assembly set forth in claim 1, wherein said caster system includes a plurality of caster frames being fixedly spaced by one of said elongated members.

9. The railing assembly set forth in claim 8, wherein each of said caster frames is supported by a plurality of said casters.

10. The railing assembly set forth in claim 1, further including an intermediate post being disposed between opposing end posts extending between rigid members thereby fixedly spacing said rigid members.

* * * * *